(12) United States Patent
Robl et al.

(10) Patent No.: US 10,739,294 B2
(45) Date of Patent: Aug. 11, 2020

(54) MODULAR MEASURING SYSTEM

(71) Applicant: Endress+Hauser Conducta GmbH+Co. KG, Gerlingen (DE)

(72) Inventors: Stefan Robl, Hünxe (DE); Michael Dieterich, Waiblingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 15 days.

(21) Appl. No.: 16/038,773

(22) Filed: Jul. 18, 2018

(65) Prior Publication Data
US 2019/0025239 A1    Jan. 24, 2019

(30) Foreign Application Priority Data

Jul. 21, 2017 (DE) ........................ 10 2017 116 504

(51) Int. Cl.
*G01N 27/28* (2006.01)
*G01D 11/24* (2006.01)
(Continued)

(52) U.S. Cl.
CPC ........... *G01N 27/283* (2013.01); *G01D 11/24* (2013.01); *G01D 11/30* (2013.01); *H01R 13/625* (2013.01)

(58) Field of Classification Search
CPC .. G01N 27/283; G01N 27/4078; G01N 29/02; G01N 2291/021; G01D 11/24;
(Continued)

(56) References Cited

U.S. PATENT DOCUMENTS 3,942,553 A * 3/1976 Gallatin .............. F15B 11/0426
  137/599.07
4,842,525 A * 6/1989 Galloway ........... B60R 16/0238
  303/119.3
(Continued)

FOREIGN PATENT DOCUMENTS

CN    1703611 A    11/2005
CN    103338969 A   10/2013
(Continued)

OTHER PUBLICATIONS

Search Report for German Patent Application No. 10 2017 116 504.5, German Patent Office, dated Jul. 21, 2017, 8 pp.

*Primary Examiner* — Suman K Nath
(74) *Attorney, Agent, or Firm* — Mark A. Logan; Endress+Hauser (USA) Holdings Inc.

(57) ABSTRACT

The present disclosure relates to a modular measuring system including a sensor element designed to be inserted into a process connection arranged in a pipe wall or container wall, and a transmitter unit that serves to process and/or transmit electronic and/or electrical signals representing the measured variable and generated by the sensor element, wherein the transmitter unit can be connected mechanically to the process connection by a coupling unit, wherein the coupling unit is arranged on an end region facing the process connection of the transmitter unit, and wherein the coupling unit can be mechanically connected to the process connection and mechanically disconnected from the process connection such that a latching element of the coupling unit arranged inside the coupling unit carries out a relative movement in relation to a counter body that can be connected mechanically to the latching element and that is arranged in the process connection.

15 Claims, 4 Drawing Sheets

(51) Int. Cl.
*G01D 11/30* (2006.01)
*H01R 13/625* (2006.01)

(58) Field of Classification Search
CPC .... G01D 11/30; G01D 11/245; H01R 13/625;
G01L 19/14; G01L 19/0092; B23P 15/26;
G01K 13/00; G01K 2201/02; G01K 1/08;
G01K 1/14; G01K 1/146; F25B 39/04;
F25B 2339/0441; F25B 2339/0443; F25B
2400/162; G01J 5/04; G01P 1/02; G01R
1/04; G10K 11/004
USPC ........................................ 73/866.5, 714, 431
See application file for complete search history.

(56) References Cited

U.S. PATENT DOCUMENTS

| | | | |
|---|---|---|---|
| 2006/0244415 A1 | 11/2006 | Denison et al. | |
| 2012/0192623 A1* | 8/2012 | Adami | G01N 33/007 73/31.05 |
| 2013/0029374 A1 | 1/2013 | Eberheim et al. | |

FOREIGN PATENT DOCUMENTS

| | | | | |
|---|---|---|---|---|
| CN | 103492867 A | | 1/2014 | |
| DE | 19857953 A1 | | 7/2000 | |
| DE | 19963912 C1 | * | 6/2001 | ........... H01R 13/625 |
| DE | 19963912 C1 | | 6/2001 | |
| DE | 10054272 A1 | | 5/2002 | |
| DE | 10218606 A1 | | 11/2003 | |
| DE | 10313639 A1 | | 10/2004 | |
| DE | 10352159 A1 | | 12/2004 | |
| DE | 202005013904 U1 | | 2/2006 | |
| DE | 102006022713 A1 | | 11/2007 | |
| DE | 102006022981 A1 | | 11/2007 | |
| DE | 102008039465 A1 | | 3/2010 | |
| DE | 202011102482 U1 | | 8/2011 | |
| DE | 102010039866 A1 | | 3/2012 | |
| DE | 102013113635 A1 | | 6/2015 | |
| DE | 102013113810 A1 | | 6/2015 | |
| DE | 102014205889 A1 | | 10/2015 | |
| DE | 102015112949 A1 | | 2/2017 | |
| EP | 1625643 B1 | | 7/2010 | |
| FR | 2808327 A1 | | 11/2001 | |
| WO | 2007090421 A1 | | 8/2007 | |

* cited by examiner

MODULAR MEASURING SYSTEM

CROSS-REFERENCE TO RELATED APPLICATION

The present application is related to and claims the priority benefit of German Patent Application No. 10 2017 116 504.5, filed on Jul. 21, 2017, the entire contents of which are incorporated herein by reference.

TECHNICAL FIELD

The present disclosure relates to a modular measuring system with a sensor element that is designed to determine and/or monitor a measured variable of a medium and can be inserted into a process connection arranged in a pipe wall or container wall, wherein the sensor element inserted into the process connection protrudes through the pipe wall or container wall, and with a transmitter unit that serves to process and/or transmit electronic and/or electrical signals that represent the measured variable and are generated by the sensor element. The present disclosure relates, in particular, to a modular measuring system with an electrochemical sensor element.

BACKGROUND

Electrochemical sensor elements are used in laboratory and process measurement technology in many areas of chemistry, biochemistry, pharmacy, biotechnology, food technology, water management, and environmental monitoring for the analysis of measuring media—in particular, of measuring liquids. Electrochemical measuring techniques allow detection of, for example, activities of chemical substances, such as ions, and of a therewith-correlated process variable of an—in particular, liquid—measuring medium. The substance whose concentration or activity is to be measured is also referred to as analyte. Electrochemical sensor elements may, for example, be potentiometric or amperometric sensor elements.

Potentiometric sensor elements typically comprise a measuring half-cell and a reference half-cell, as well as a measurement circuit. The measuring half-cell includes a potential-forming element, which may comprise, for example, a redox electrode, an analyte-sensitive coating, or an ion-selective membrane, depending upon the type of potentiometric sensor element. The measurement circuit generates a measurement signal that represents the potential difference between the measuring half-cell and the reference half-cell. Examples of potentiometric sensor elements are ion-selective electrodes (ISE). A special case of such an ion-selective electrode is the known pH glass electrode, which has a chamber which is closed by a pH-sensitive glass membrane and includes an internal electrolyte contained therein and a discharge element immersed therein.

Amperometric sensor elements, e.g., amperometric disinfection sensors, may, for example, have an—in particular, potentiostatic—control circuit which is designed to preset a nominal voltage between a working electrode and a reference electrode and to detect the current flowing between the working electrode and the counter electrode in the process. One example of an amperometric sensor element is described in DE 10 2008 039 465 A1, for example.

Other examples of electrochemical sensor elements are such as are based upon electrolyte isolator semiconductor layer stacks (for short: EIS). These layer systems may, for example, be operated capacitively or as ion-selective field-effect transistors (ISFET). DE 198 57 953 A1 describes such a sensor element designed to measure the ion concentration or the pH value of a measuring medium using an ISFET.

Within the scope of this application, the term, "electrochemical sensor elements," furthermore includes conductively- or capacitively-operating conductivity sensors, as well as (spectro)photometrically-operating sensors, such as turbidity sensors.

The sensor elements are in this case in contact with the process via the process connection and thus typically, at least partially and at least intermittently or, in particular, substantially mostly, come into contact with the measuring medium. In the case where the sensor element is an electrochemical sensor element used in the aforementioned industries, regular removal of the sensor element from the process is necessary.

On the one hand, the removal serves to clean the sensor element at regular intervals—for example, in order to cleanse it of bacteria and other microorganisms. In this respect, autoclaving, in which the sensor element is cleaned at high temperature (approx. 140° C.) and high pressure using water vapor, has proven itself as the sterilization method. Autoclaving is used, in particular, for electrochemical sensor elements—for example, in the pharmaceutical industry, food industry, medical technology, and to her fields.

On the other hand, calibration, verification, and/or adjustment of the sensor element may be necessary at regular intervals. In this case, calibration usually means the determination of a deviation of the first measured value measured by the sensor element from a reference measured value provided by a second sensor element and accepted as correct. The verification also comprises the determination of the deviation and its assessment or evaluation. Lastly, adjustment means the adaptation of the sensor element in such a way that a model used by the sensor element to determine a measured value from a raw value is adapted such that the measured value corresponds to the reference value provided by the second sensor element. The sensor element also has to be removed from the process for calibration, verification, and/or adjustment.

Depending upon the degree to which the electrochemical sensor element is stressed and/or damaged in the process by the contact with the measuring medium and/or the aforementioned regular cleaning, a regular exchange of the sensor element may also be necessary.

In order to process and/or transmit electronic and/or electrical signals generated by the sensor element—for example, to a transmitter unit or a higher-level unit, e.g., a control center—the sensor element is often connected to a connection element.

The connection element comprises a cable attachment and a cable, which in turn is connected to the higher-level unit. An interface that is, for example, designed to be inductive or optical is respectively located on the sensor element and on the connection element. Via these interfaces, the sensor element is supplied with energy, and/or communication between the sensor element and the connection element is ensured; this is described, for example, in EP 1 625 643.

In this respect, reference is also made, in particular, to the products with the name, "Memosens," by the applicant. Other generic designs are, for example, "Memosens" by the company Knick, "ISM" by Mettler-Toledo, the "ARC" system by Hamilton, and "SMARTSENS" by Krohne.

The great advantage of the known "Memosens" plug connection is that the above-described regular removal of the sensor element from the process is easily possible. The sensor element can be removed from the process easily and can, where applicable, be brought into the laboratory for calibration and/or adjustment (for example, by means of a so-called "Memobase Plus" system). When a first sensor element is removed, for example, it can, moreover, be replaced directly at the measuring site close to the process by a second sensor element. As a result, the maintenance duration or idle times of the process system and, ultimately, also the costs are drastically reduced. Another advantage is that the electronic components of the sensor element and of the connection element are protected as a result of their— where applicable—liquid-tight design when the plug connection is disconnected. This is important in order to prevent, for example, moisture ingress during a hot steam jet cleaning used for hygienic reasons in the industries mentioned at the beginning.

A disadvantage of the connection by means of the connection element with cable attachment and cable is that a connected transmitter unit must be placed at a distance from the sensor element itself. An arrangement of the transmitter unit close to the process or close to the sensor element is, however, often desired, even if only to be able to calculate and display the process variable, which can be determined by the sensor element in combination with the transmitter unit, close to the process. Within the scope of the application, a "transmitter unit" refers to a unit which comprises electronic components and by means of which at least the process variable of the sensor element can be determined completely, and with which a standardized transmission of the process variable to a higher-level unit is possible. For this purpose, the transmitter unit has, for example, a microprocessor and/or a storage unit.

Such a standardized transmission takes place using a standardized wired or wireless communications network. In the simplest case, this network is formed as a measurement transmission path according to the 4-20 mA standard. A wired communications network can, for example, furthermore be a wired fieldbus of automation technology, such as Foundation Fieldbus, Profibus PA, Profibus DP, HART, CANBus, etc. It can, however, also be a modern industrial communications network, such as an "Industrial Ethernet" fieldbus—in particular, Profinet, HART-IP, or Ethernet/IP, or a communications network known from the communications sector, such as Ethernet according to the TCP/IP protocol. In the case of a wireless communications network, it can, for example, be a Bluetooth, ZigBee, WLAN, GSM, LTE, UMTS communications network, or even a wireless version of a fieldbus—in particular, of a standard based upon 802.15.4, such as WirelessHART.

SUMMARY

The present disclosure is based upon the aim of providing a measuring system with a transmitter unit that can be arranged adjacent to the process connection and with which easy and fast removal of the sensor element from the process is possible.

The aim is achieved by a modular measuring system with a sensor element that is designed to determine and/or monitor a measured variable of a medium and can be inserted into a process connection arranged in a pipe wall or container wall, wherein the sensor element inserted into the process connection protrudes through the pipe wall or container wall, and with a transmitter unit that serves to process and/or transmit electronic and/or electrical signals that represent the measured variable and are generated by the sensor element. According to the present disclosure, the transmitter unit can be connected mechanically to the process connection by means of a coupling unit of the transmitter unit. The coupling unit is arranged on an end region, which faces the process connection, of the transmitter unit. The coupling unit of the transmitter unit can be connected mechanically to the process connection and can be disconnected mechanically from the process connection as a result of a latching element of the coupling unit that is arranged inside the coupling unit carrying out a relative movement in relation to a counter body that can be connected mechanically to the latching element and that is arranged in the process connection.

By means of the coupling unit of the measuring system according to the present disclosure, the transmitter unit can be repeatedly connected mechanically to the process connection and disconnected mechanically therefrom. This is made possible by the latching element that is arranged inside, i.e., in the interior of, the coupling unit and that carries out a relative movement in relation to the process connection or to the counter body of the process connection when the mechanical connection is disconnected or connected.

In the case where the coupling unit is mechanically connected to the process connection, a form-fitting and force-fitted connection, in particular, exists between the latching element of the coupling unit and the counter body of the process connection.

In the case where the coupling unit is mechanically disconnected from the process connection, the transmitter unit can be moved away from the process connection in an axial direction along the longitudinal axis of the coupling unit. Afterwards, the sensor element inserted into the process connection can be removed therefrom in order to be cleaned, exchanged, calibrated, verified, and/or adjusted, as mentioned at the beginning.

The process connection is, for example, designed as a pipe screw connection for the food and chemistry sectors according to DIN 11851, also colloquially called "dairy coupling," which is particularly easy to clean and is therefore often used in the industries mentioned at the beginning. The process connection may, naturally, also comprise a clamped connection—for example, a clamped connection for pipes made of corrosion-resistant steel, such as the so-called "Tri-Clamp" pipe fitting, which is described in various standards, e.g., DIN 32676 or ISO2852. Naturally, other process connections known from the prior art are also possible in combination with the present disclosure, e.g., aseptic pipe connections according to DIN 11864. Examples are the process connection sold by the company Geo Tuchenhagen under the brand name, "Varivent," or an embodiment of the so-called SMS screw connection by the company Wagnerinox.

In a preferred embodiment of the present disclosure, the mechanically-disconnectable connection between the coupling unit and the process connection is designed as a simple quick-coupling. This allows for a particularly quick or easy mechanical disconnection or connection of the transmitter unit from the process connection.

As a result of the latching element being arranged inside the coupling unit, a tool that can be placed onto the coupling unit from the outside is not necessary for disconnecting the connection between the latching element and the counter body. In a particularly preferred embodiment, the coupling unit is therefore designed such that the relative movement between the latching element, arranged inside the coupling unit, and the counter body can be triggered in a toolless manner. As a result, the coupling unit can be connected mechanically to the process connection in a toolless manner and can be disconnected mechanically from the process connection in a toolless manner. "Toolless" means that a tool is not required for disconnecting or connecting the mechanical connection. Instead of using a tool, a user can, for example, trigger the relative movement by manually manipulating the coupling unit. "Manually" within the scope of this application means that the possibility of direct manual manipulation of the coupling unit exists and that an additional tool, such as a wrench for loosening a threaded nut, is, in principle, not necessary.

Alternatively, the automatic execution of the relative movement can, for example, be initiated by the user by means of a trigger. This comparatively simple solution further facilitates a quick disconnection or connection of the transmitter unit and the process connection. As a result of the toolless design, an application engineer can, for example, first disconnect the mechanical connection, move the transmitter unit with one hand away from the process connection, and then remove the sensor element from the process connection with the other hand.

In a development of the present disclosure, the counter body has at least one groove and the latching element respectively has a counter piece that corresponds to the groove, or the latching element has at least one groove and the counter body respectively has a counter piece that corresponds to the groove. In the case where the process connection is connected mechanically to the coupling unit, the at least one corresponding counter piece protrudes into the at least one groove. In this development of the present disclosure, a groove/counter piece mechanism is thus used when latching the latching element into the counter body of the process connection. In doing so, a plurality of grooves and corresponding counter pieces that are arranged at different points of the latching element—for example, at least three each—is, in particular, possible.

In another development of the present disclosure, the counter body that can be connected mechanically to the latching element is a base plate that is arranged in the process connection and compatible with the coupling unit and the sensor element. The base plate has a recess into which the sensor element can be inserted so that the sensor element inserted into the recess protrudes through the base plate.

The base plate can, advantageously, be adapted to the specific sensor element. As a result, an existing process connection can, in particular, be adapted to the respective sensor element by means of the base plate. For example, the length of a section of the sensor element protruding through the process connection can be adjusted by means of the design of the base plate, e.g., by means of its thickness. Another advantage is that the process connection and/or the coupling unit can continue to be used without additional retrofitting when a first sensor element is replaced by a second sensor element, and the base plate is replaced at the same time by a base plate that is compatible with the second sensor element and the coupling unit.

In one embodiment of the present disclosure, the base plate can, in particular, be screwed into the process connection.

In an alternative embodiment of the present disclosure, the base plate can be clamped into the process connection.

In one embodiment of the present disclosure, the sensor element can be disconnected from the base plate—in particular, be plugged, screwed, and/or clamped into the base plate.

In another embodiment of the present disclosure, the relative movement is a rotation of the latching element of the coupling unit relative to the counter body of the process connection by an angle of rotation (a) of less than 360°.

This solution has a great advantage in comparison to designs in which a thread must be unscrewed or screwed on when connecting or disconnecting the mechanical connection. Since a thread has several thread turns, the relative movement in the case of the latter includes a rotation by an angle that corresponds to a multiple of 360° and the number of thread turns. On the other hand, a significantly smaller relative movement is required in this embodiment of the present disclosure, which ultimately also allows for an accelerated connection and disconnection of the mechanical connection. During the rotation, the at least one groove is, in particular, turned into the at least one counter piece. The mechanical connection in this embodiment is thus, for example, essentially a bayonet connection between the transmitter unit and the process connection.

In a preferred embodiment of the present disclosure, the coupling unit has a first section, which is arranged on an outside wall of the coupling unit and adjoins the process connection, and a second section, which is arranged on an outside wall of the coupling unit and adjoins the first section in a direction facing away from the process connection. The first and the second sections can be turned against each other manually and/or be moved towards each other manually in an axial direction along the longitudinal axis of the coupling unit. The mechanical connection between the latching element and the counter body can be disconnected by means of the manual rotation of the first section relative to the second section and/or by means of the manual movement of the first section relative to the second section. In particular, the coupling unit can only be moved away from the process connection in the axial direction when the first and second sections are rotated and/or moved relative to each other.

This embodiment thus describes a manual variant of the toolless design. In this case, the latching element arranged inside the coupling unit is disconnected from the counter body, e.g., the base plate, by means of a manual rotation of the two sections against each other and/or by means of a manual movement of the two sections towards each other.

For this purpose, in one embodiment of the present disclosure, the second section is, essentially, firmly connected to the latching element. As a result, when the second section is, for example, manually rotated relative to the first section, the latching element is correspondingly also moved relative to the first section and therefore also carries out the corresponding rotational movement relative to the first section and relative to the counter body of the process connection, e.g., the base plate. By means of the outside manual manipulation on the outside wall of the coupling unit, the corresponding counter pieces, for example, of the latching element can thus be turned out of the grooves of the base plate.

Where applicable, the first section can also, for example, have a second counter piece on the inside wall, similarly to the latching element, said second counter piece engaging, in addition to the counter piece of the latching element, in the same groove of the base plate.

Where applicable, the first and/or the second sections of the coupling unit have a profile on the surface of the outside wall, in order to facilitate the manual manipulation of the two sections relative to each other, i.e., the rotation or movement, for the user.

The manual rotation is also, in particular, a rotation by an angle of rotation of less than 360°.

In a particularly preferred development of this embodiment, a predetermined counterforce exists in the case where the latching element is mechanically connected to the counter body. The counterforce counteracts a force required for manually disconnecting the mechanical connection between the coupling unit and the process connection.

This is, in particular, a magnetic force and/or a spring force caused by a spring element.

The force required to manually disconnect the mechanical connection is, in particular, a force that is required to manually rotate the first section relative to the second section and/or to manually move the first section relative to the second section.

In this particularly preferred development, a self-locking or self-clamping solution is provided by means of the counterforce. As a result, the mechanically-disconnectable connection is particularly stable or secured so that it cannot be disconnected unintentionally under the mechanical vibrations occurring in the process system, for example.

The spring force can, for example, be brought about by arranging a spring element between the first section and the latching element, which can be moved relative to each other. In the case of the existing mechanical connection between the latching element and the counter body, this spring element is more relaxed compared to the spring element in the position of the coupling unit, where the first and second sections are manually rotated and/or moved relative to each other such that the coupling unit can be moved away from the process connection in the axial direction.

The spring element arranged between the first section and the latching element counteracts the rotation of the first section relative to the second section and to the latching element connected thereto. A force that is larger than the spring force caused by the spring element and acting as counterforce must therefore be applied in order to open the mechanical connection between the latching element and the counter body.

Another possibility is to design the latching element and the counter body, e.g., the groove(s) and the respective corresponding counter piece, as permanent magnets. The poles of the permanent magnets are then, for example, designed such that a force pointing in the direction of the groove acts on the corresponding counter piece.

In another preferred embodiment of the present disclosure, the coupling unit has an electric drive arranged inside the coupling unit. The electric drive is designed to move the latching element relative to the counter body that can be connected mechanically thereto and that is arranged in the process connection, so that the mechanically-disconnectable connection between the coupling unit and the process connection can be disconnected or locked by means of a control of the electric drive.

This embodiment thus describes an automatic or motor-driven variant of the toolless embodiment. In this case, the coupling unit can be manipulated from the outside wall of the coupling unit, for example, neither by means of a tool nor manually. Only by means of an appropriate control of the electric drive arranged inside the coupling unit can the latching element carry out the movement relative to the counter body required to disconnect or connect the mechanical connection.

In a development of the present disclosure, the coupling unit is designed such that the coupling unit seals the coupling unit the transmitter unit in a liquid-tight manner in the end region, which faces the process connection, of the transmitter unit in case the coupling unit is mechanically disconnected from the process connection and moved away from the process connection.

At its end region, which faces the process connection, of the transmitter unit, for example, the coupling unit has a sealing element for this purpose. Alternatively or additionally, the transmitter unit is designed to be liquid-tight by the selection of the materials for the coupling unit—in particular, in the end region—and/or by the selection of a sealing geometry in the end region. As a result, a liquid medium, e.g., a measuring medium coming from the process and/or a medium used during cleaning, cannot enter the interior of the coupling unit from the end region facing the process connection. The electric or electronic components of the coupling unit or of the transmitter unit are thereby protected against the entry of liquid.

In a particularly preferred development of the present disclosure, a plug connection arranged inside the transmitter unit is provided, wherein the plug connection connects an end region of the sensor element to the transmitter unit in the case where the sensor element is inserted into the process connection, and the coupling unit is mechanically connected to the process connection. The plug connection is designed for a magnetic inductive transmission of electronic and/or electrical signals generated by the sensor element to the transmitter unit. In this context, reference is made to the "Memosens" plug connection, mentioned already at the beginning, and its advantages.

The modular measuring system according to the present disclosure has, in particular, powerful synergistic effects in connection with such a plug connection, since other electrical connections, such as cable connections, running between the transmitter unit and the sensor element do not have to be present. The sensor element and the transmitter unit of the measuring system can thus be completely disconnected from each other by disconnecting the mechanical connection between the process connection and the coupling unit. As a result, the modular structure of the measuring system can be implemented and adapted to the respective process connection particularly easily. When the (head) transmitter unit close to the process is present at the same time, this development also exhibits the full advantages of such a plug connection already mentioned at the beginning, viz., the very easy and fast removal of the sensor element for the purposes of exchanging the sensor element and/or of verifying, calibrating, and/or adjusting the sensor element.

Irrespective of these advantages, the present disclosure is, however, naturally not limited to the solution comprising this plug connection, so that a galvanically-coupled electrical connection between the sensor element and the transmitter unit exists in an alternative embodiment of the present disclosure. Said electrical connection comprises, for example, electric contacts, such as cable connections, running between the transmitter unit and the sensor element.

In another development of the present disclosure, the transmitter unit can be connected to a wired and/or wireless communications network. The communications network serves to supply energy to the measuring system and/or to transmit electronic and/or electrical signals between a higher-level unit, connected to the communications network, and the transmitter unit. On the one hand, the electronic and/or electrical signals are signals that are generated by the sensor element, represent the measured variable, and are transmitted via the communications network from the transmitter unit to the higher-level unit. On the other hand, electronic and/or electrical signals can, naturally, also be transmitted via the communications network from the higher-level unit to the transmitter unit, e.g., in order to control the transmitter unit and/or to transmit parameters that are used by a calibration function stored in the transmitter unit.

In this respect, reference is made, in particular, to the examples mentioned at the beginning of a communications network. In order to supply energy to the sensor element and to the transmitter unit, the transmitter unit can, in particular, also be equipped with a battery, so that no other wired connection to the transmitter unit by means of a cable must, in principle, be provided in the case of a wireless communications network.

In one embodiment of this development, the measuring system is designed to transmit to the higher-level unit, via the communication connection, the disconnection of the mechanical connection between the transmitter unit and the process connection and/or the disconnection of the connection between the transmitter unit and the sensor element. In the case of such a disconnection, a warning is triggered in the control system, for example.

In one embodiment of this development, the electric drive can be controlled by means of the communications network and/or by means of a display and/or operating unit arranged on the transmitter unit.

The display and/or operating unit of the transmitter unit is a unit designed to display and/or operate the transmitter unit and/or the sensor element, e.g., a display with or without operable buttons.

By means of an entry of a user at the display and/or operating unit, the mechanical connection, for example, between the transmitter unit and the process connection is disconnected. Alternatively, a control of the electric drive can take place by means of an appropriate command, which is transmitted via the communications network to the transmitter unit. Further, in this embodiment, a combined control of the electric drive via the communications network and via an entry at the display and/or operating unit can take place. For example, an approval for controlling the electric drive via the display and/or operating unit is carried out via the communications network, e.g., by transmitting a digital key. Only after such an approval has taken place can the electric drive also be controlled via the local display and/or operating unit of the transmitter unit. This additional authorization provides increased security against unauthorized manipulation.

In a preferred development of the present disclosure, the base plate and the coupling unit are designed such that the base plate can be removed from the process connection only in the case where the coupling unit of the transmitter unit is disconnected from the base plate and moved away from the base plate in a direction substantially orthogonal to the base plate.

A complete removal of the base plate, the sensor element, and the transmitter unit from the process connection is thereby excluded when the mechanical connection between the transmitter unit and the base plate is established. Particularly in combination with the variant comprising the electric drive, high protection against manipulation is provided in this embodiment of the present disclosure.

To this end, a portion of the transmitter unit, for example, overlaps the process connection such that access to an, in principle, disconnectable connection between base plate and process connection is limited.

In the aforementioned case of the so-called dairy coupling, an end section of the transmitter unit that is designed similarly to a union nut, for example, extends over a slotted nut of the dairy coupling, for example. In the case where the transmitter unit is mechanically connected to the process connection, access to the slotted nut is thus blocked. Manipulation of the slotted nut, by means of which the base plate can be taken out of the process connection, for example, is thus excluded. Only in the case where the approval for disconnecting the mechanical connection has taken place as, for example, mentioned above, can the transmitter unit thus first be disconnected from the process connection and then, where applicable, the base plate also be removed from the process connection. Appropriate safety devices are, naturally, also possible in process connections designed differently than dairy couplings. In this preferred development, there is thus a particularly high protection against manipulation.

In one embodiment of the present disclosure, the sensor element is an electrochemical sensor element. An electrochemical sensor element is, for example, in particular, an amperometric or potentiometric sensor as mentioned above, such as an ion-selective electrode or a conductivity sensor, an ISFET, or another of the aforementioned electrochemical sensor elements.

In another embodiment of the present disclosure, the sensor element is designed to be elongated. The coupling unit has a guide that is elongated in the axial direction of the coupling unit and that is arranged inside the coupling unit. In the case where the coupling unit is mechanically connected to the process connection, the sensor element is accommodated in the guide. In this case, the sensor element is thus completely arranged inside the coupling unit. The guide is, in particular, a guide corresponding to the sensor element.

BRIEF DESCRIPTION OF THE DRAWINGS

The present disclosure will be explained further with reference to the following figures, which are not necessarily true-to-scale, wherein the same reference signs designate the same features. For reasons of clarity, or if it appears sensible for other reasons, previously-noted reference signs will not be repeated in the following figures.

Shown are.

DETAILED DESCRIPTION

Figure 1:
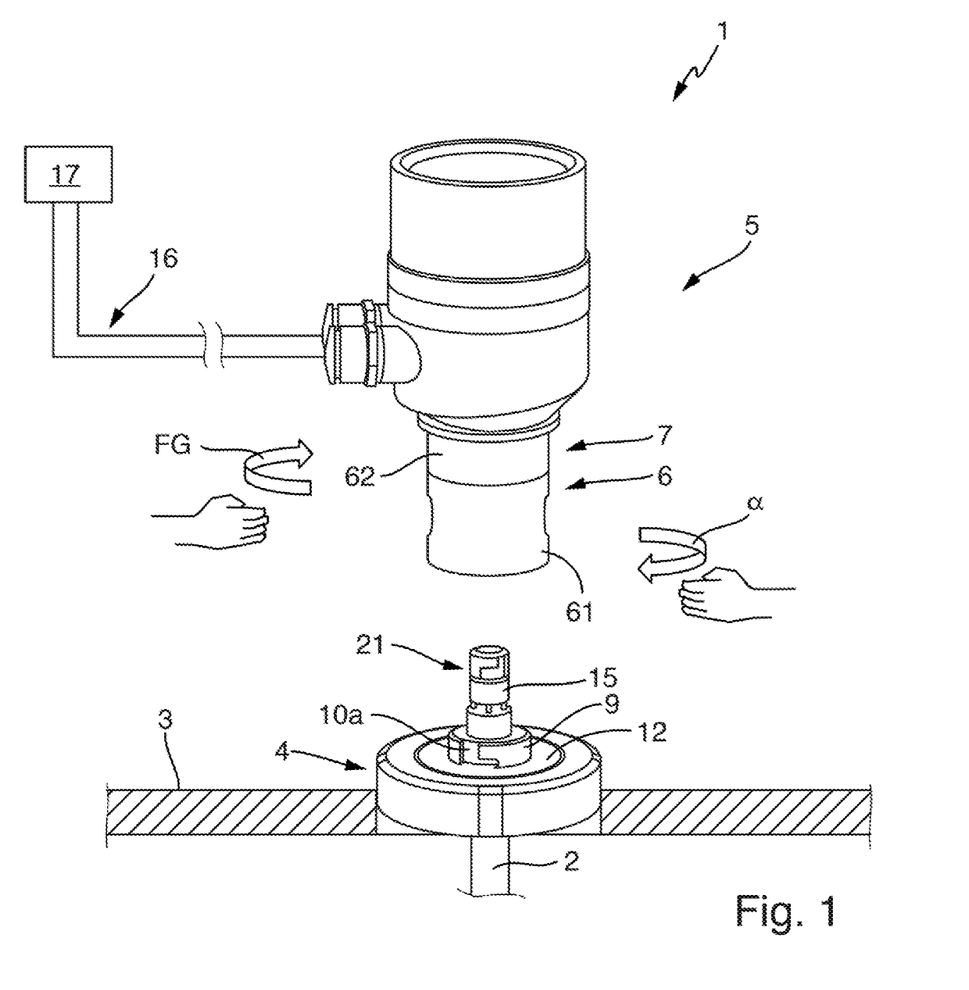
FIG. 1: A perspectival view of an embodiment of the measuring system according to the present disclosure.

FIG. 1 shows a perspectival view of an embodiment of the measuring system 1 according to the present disclosure. This embodiment is, as indicated, the variant of the manually disconnectable/connectable toolless mechanical connection between a transmitter unit 5 and a process connection 4. A very simple and quickly-disconnectable mechanical connection between the process connection 4 and the transmitter unit 5 is provided; this is achieved by means of a coupling unit 6 of the transmitter unit 5. The coupling unit 6, which is in this case designed to be in two parts, is arranged in an end region 7, which faces the process connection, of the transmitter unit 5. FIG. 1 shows the transmitter unit 5 as disconnected and moved away from the process connection 4. In this respect, the sensor element 2 remains in the process connection 4 when the transmitter unit 5 is moved away from the process connection 4.

In this embodiment, the process connection 4 is arranged in a pipe wall 3 and comprises a union nut of the dairy coupling already mentioned by way of example. Inserted into the process connection 4 is a base plate 12, with which the modular measuring system 1 can be adapted while the union nut remains the same, i.e., while the process connection 4 substantially remains the same. Depending upon the embodiment of the sensor element 2 (in this case, a pH electrode), the sensor element 2 has, for example, a specific length. In the case of tight installation situations, e.g., in case of small pipe diameters, the section of the sensor element 2 protruding through the process connection 4 can be correspondingly minimized by means of a base plate 12 that is designed to be thicker. Naturally, the process connection 4 can also, additionally or alternatively, be adapted to the modular measuring system 1 by a selection or adaptation of the union nut.

At an end region 21 facing away from the process connection 4, the pH electrode inserted into the base plate 12 has a first connecting partner of a magnetic inductive plug connection 15, e.g., the known and aforementioned "Memosens" plug connection. The second connecting partner of the magnetic inductive plug connection 15 is arranged inside the coupling unit 6 of the transmitter unit 5; see also FIG. 2b. This variant is advantageous in that no electrical feedthroughs or connections between the transmitter unit 5 and the sensor element 2, e.g., a cable connection, are provided in the case where the transmitter unit 5 is moved away from the process connection 4. As a result, on the one hand, a complete separation of the components of the modular measuring system 1, and thus, also, a very easy exchange of the components or a very easy adaptation of the modular measuring system 1, are made possible. On the other hand, such cable connections, where applicable, would be sensitive to the influence of a liquid medium. In contrast, the plug connection 15 is designed to be liquid-tight.

In its end region 7, the transmitter unit 5 is also protected against entry of a liquid medium into the interior of the transmitter unit 5 (or into the interior of the coupling unit 6 of the transmitter unit 5) by the coupling unit 6 being sealed in a liquid-tight manner.

As already mentioned, the present disclosure is, naturally, not restricted to the embodiment comprising this plug connection, irrespective of its advantages.

In the manually-operable variant shown here, a first section 61 of the coupling unit 6 is rotated manually by an angle α of approx. 60° relative to a second section 62 of the coupling unit 62. In order to rotate the first section 61 and the second section 62 relative to each other, a force acting against a counterforce FG must be applied. The counterforce FG is brought about by a spring element 18 (see FIGS. 2a, b), for example.

By the rotation, a latching element 8, which is arranged inside the coupling unit 6 (see FIGS. 2 and 3) and firmly connected to the second section 62, is rotated relative to the first section 61 such that the transmitter unit 5 with its coupling unit 6 is can be placed upon the base plate 12. If the first section 61 is released after the placement, only the counterforce FG still acts. As a result, the coupling unit 6 bounces back into the direction of its initial position, whereby the latching element 8 engages in the counter body 9. The mechanical connection is designed to be self-locking as a result. This is, in particular, advantageous when strong vibrations, for example, are present in a process system, e.g., a food-processing machine.

An additional locking device may, naturally, be added to the measuring system 1, independently of the embodiment shown here. This achieves an additional security against an undesired disconnection of the mechanical connection in applications with a very high vibration load, for example.

The transmitter unit 5 is connected to a higher-level unit 17 via a communications network 16—in this case, a 4-20 mA measurement transmission path. The communications network 16 may, naturally, also be designed according to one of the embodiments mentioned at the beginning. The higher-level unit 17 is, for example, a stored program control unit (SPS) that is arranged in the control room and designed to control the process system.

Figure 2A:
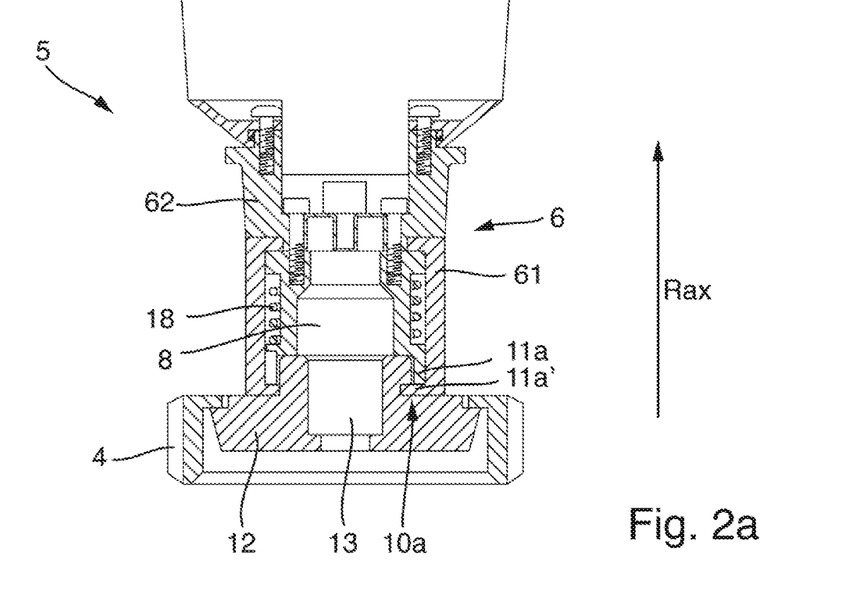
FIGS. 2a, 2b: Sectional views of various embodiments of the measuring system according to the present disclosure.
Figure 2B:
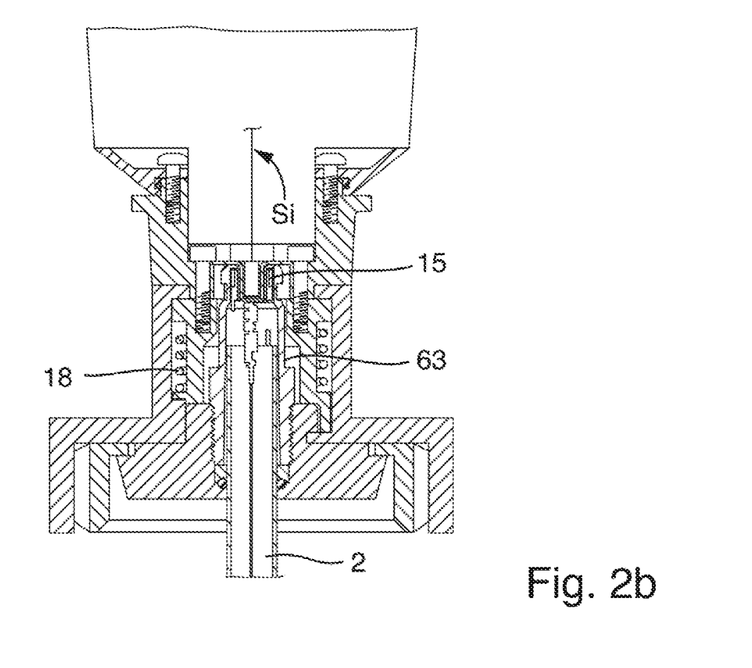

FIGS. 2a, b show two sectional views (each with two different sectional planes parallel to each other) of the transmitter unit 5 connected to the process connection 4 in two slightly different embodiments of the measuring system 1 according to the present disclosure.

In this case, FIG. 2a shows the latching element 8 and the spring element 18 arranged between the latching element 8 and the first section 61, in addition to the components of the coupling unit 6 explained in connection with FIG. 1. Particularly in the case of an existing mechanical connection between the coupling unit 6 and the process connection 4, the spring element 18 is more relaxed compared to the position shown in FIG. 1 of the first section 61 and the second section 62, in which the coupling unit 6 can be placed onto the process connection 4 or can be moved away from the process connection 4 in the axial direction Rax. As a result, the spring element 18 ensures the already-mentioned self-clamping or self-locking. On the one hand, because the counterforce FG must be overcome in order to disconnect the mechanical connection. On the other hand, the spring element 18 is, possibly, not yet completely relaxed, even in the case of an existing mechanical connection between the coupling unit 6 and the process connection 4. As a result, the spring element 18 continues to try in this case to reach its initial position so that the counterforce FG acts as additional stopping force by means of the spring element 18 in the case of an existing mechanical connection.

Another solution for achieving such a counterforce provides, in addition or as alternative to the spring element 18, for a latching element 8 that is magnetic, at least sectionwise, or a counter body 9 that is magnetic, at least sectionwise.

The latching element 8 has a counter piece 11a that engages in a groove 10a of the base plate 12. Where applicable, the first section 61 can also have a counter piece 11a' on the inside wall, similarly to the latching element 8, said second counter piece engaging in the same groove 10a of the base plate, in addition to the counter piece 11a of the latching element 8. This is explained in more detail further below in connection with FIGS. 3a-d.

In another sectional plane, FIG. 2b shows the sensor element 2 accommodated in a guide 63 of the coupling unit 6, as well as the plug connection 15 between the sensor element 2 and the transmitter unit 5. As mentioned above, this plug connection is designed as a "Memosens plug connection" in the manner known. The electronic signals Si are transmitted from the sensor element 2 to the transmitter unit 5 via the plug connection 15.

The other components of the transmitter unit 5, e.g., its electronic components, are not shown for the sake of simplicity; the further designation of the components already mentioned in FIG. 2a is also dispensed with for the sake of clarity.

In contrast to FIG. 2a, in FIG. 2b, the first section 61 of the embodiment is designed such that it extends over, or overlaps, the slotted nut of the process connection 4. As a result, manipulation at the slotted nut, which would, for example, make the removal of the base plate 12 from the process connection 4 possible, is excluded in the case of existing mechanical connection between the transmitter unit 5 and the process connection 4. This results in an increased protection against manipulation.

Figures 3A, 3B:
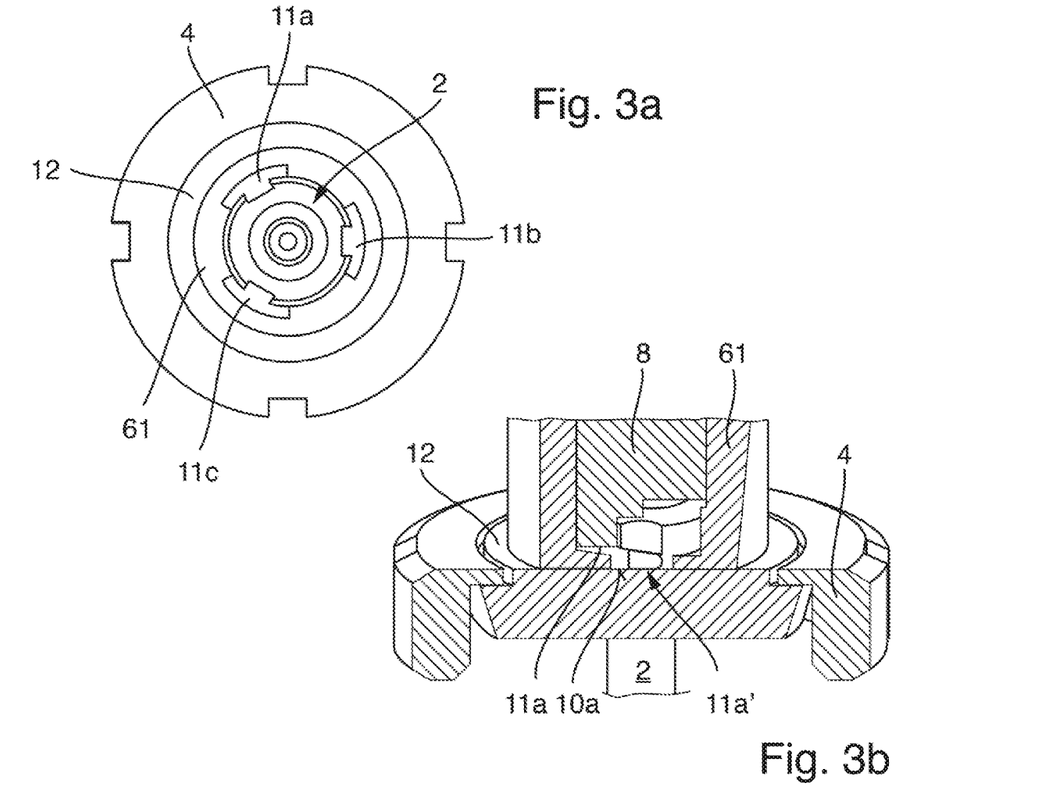
FIGS. 3a-d: Various views of components of the measuring system according to the present disclosure in an embodiment of the measuring system according to the present disclosure.

FIG. 3a shows a sectional plane of an embodiment of the measuring system 1 according to the present disclosure in a sectional plane that is orthogonal to the sectional plane of FIG. 2a.

FIG. 3b shows a perspective view of the mechanical connection between the transmitter unit 5 and the process connection 4 already shown in the sectional view in FIG. 3a, wherein the detailed view of the mechanical connection shows, in particular, the first section 61 and the latching element 8 in more detail.

Figures 3C, 3D:
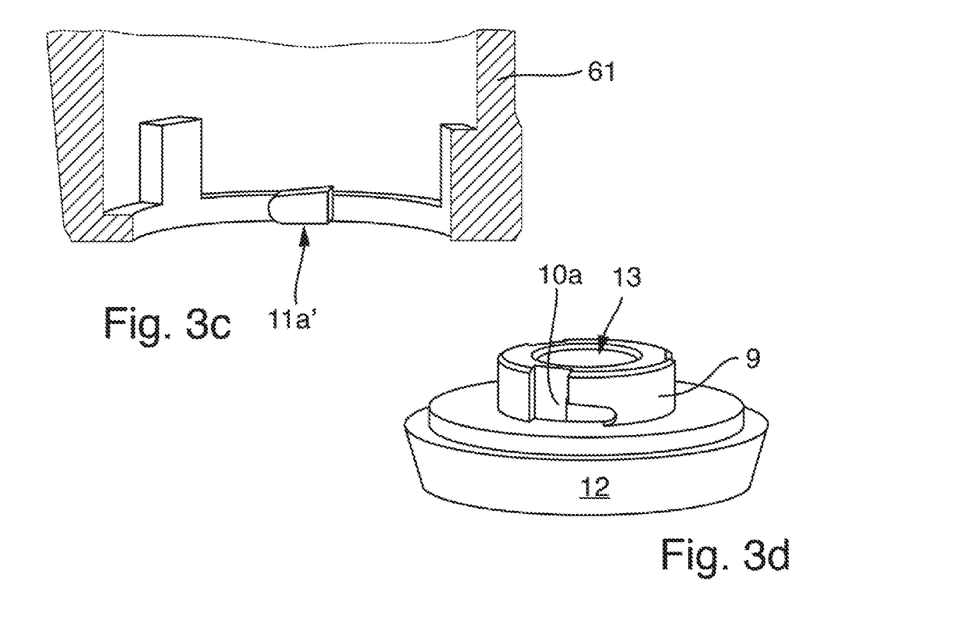

FIG. 3c shows a perspective view of a counter piece 11a' designed as an immersion profile.

FIG. 3d shows a perspective view of an embodiment of a base plate 12.

In this embodiment, the latching element 8 has several counter pieces 11a, 11b, 11c; cf. FIG. 3a—three counter pieces 11a, 11b, 11c in this case. These counter pieces respectively engage in a groove 10a, 10b, 10c of the base plate 12, when the mechanical connection is connected.

Three additional counter pieces 11a', 11b', 11c' designed as immersion profiles (see FIG. 3c) are arranged on the inside wall of the first section 61. As a result of a rotation caused by the counterforce, the counter pieces 11a, 11b, 11c, 11a', 11b', 11c' of the coupling unit 6 cant with the base plate 12 in the process connection 4 and form a stable connection via a type of tripod (see FIG. 3a).

In this case, the counter pieces 11a, 11b, 11c of the latching element 8 are respectively pushed against a first region of the groove 10a, 10b, 10c, and the counter pieces 11a', 11b', 11c' of the first section 61 designed as immersion profiles are respectively pushed against a second region of the groove 10a, 10b, 10c. The two regions of the groove 10a can, for example, be seen in FIG. 3d. A pushing of the latching element 8 against the base plate 12 is realized by the inclined stop surface shown in FIGS. 3c, 3d.

By means of a manual force (cf FIG. 1) applied to the first section 61 and second section 62 against the counterforce of the spring element 18 (cf. FIGS. 2a, b), the counter pieces 11a', 11b', 11c' designed as immersion profiles move out of the grooves 10a, 10b, 10c of the base plate 12. As a result, these counter pieces form a unit in the axial direction Rax with the counter pieces 11a, 11b, 11c of the latching element 8. Since tension and resistance in the axial direction Rax no longer exist in this state, the coupling unit 6 disconnected in this way can be moved with the transmitter unit 5 away from the process connection 4.

The coupling unit 6 described in FIGS. 1 through 3 can, essentially, be compared to a bayonet coupling. As already mentioned, the present disclosure can also be equipped with a coupling unit 6 with a simple quick-coupling, in which the coupling unit 6 has two sections 61, 62 that can be moved relative to each other in the axial direction Rax of the coupling unit 6.

Figure 4:
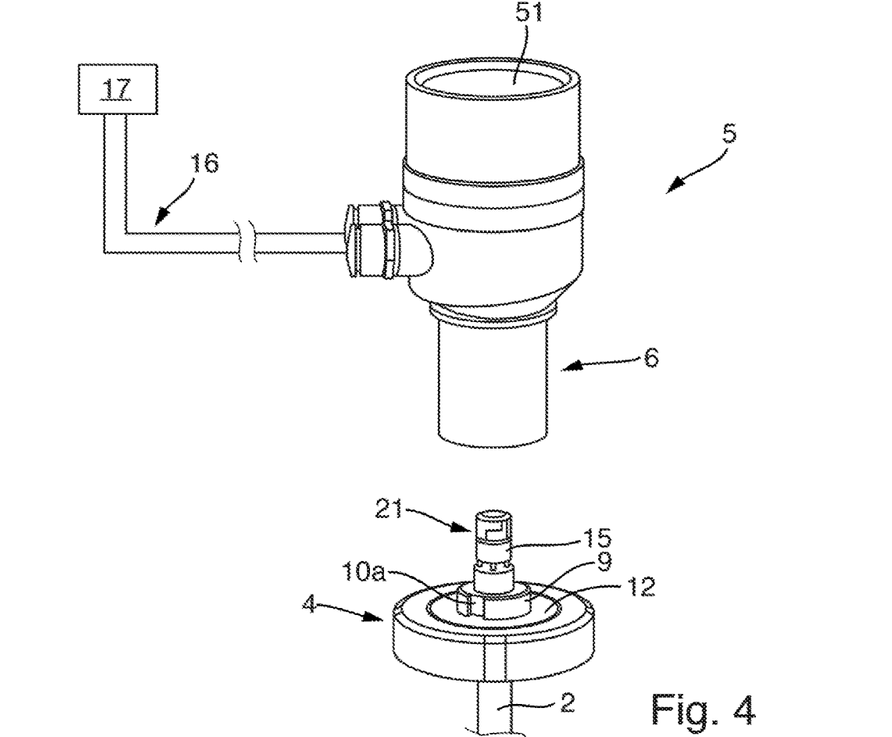
FIG. 4: A perspectival view of another embodiment of the measuring system according to the present disclosure.
Figure 5A:
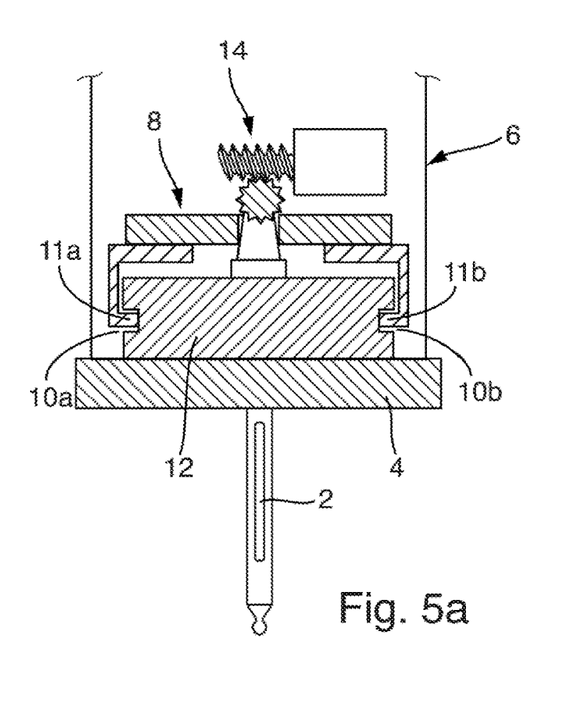
FIGS. 5a, 5b: A sectional view and a perspectival view of another embodiment of the measuring system according to the present disclosure.
Figure 5B:
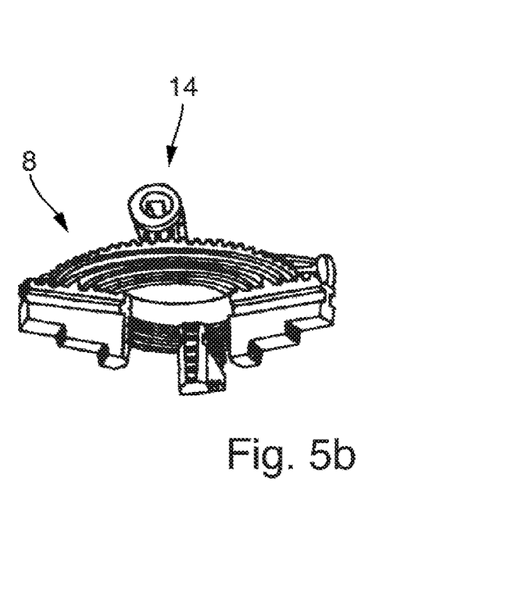

FIGS. 4 and 5a, b show a variant of the measuring system 1 according to the present disclosure, in which the coupling unit 6 that can be disconnected or connected in a toolless manner is realized by means of an electric drive 14, which is arranged inside the coupling unit 6, instead of the previously described manual mechanism.

In this embodiment of the measuring system, the outside wall of the coupling unit 6 is preferably essentially designed to be one part or one piece. As a result, the coupling unit 6 has, for example, no sections 61, 62 that can be moved relative to each other and are arranged on the outside wall as in the manual variant described above. This facilitates the realization of a hygienic design.

The relative movement between the latching element 8 and the counter body 9 of the process connection 4, which is required for mechanically connecting or disconnecting, is now carried out autonomously by means of the electric drive 14. The electric drive 14 can in this case be controlled by a display and/or operating unit 51 of the transmitter unit 5. By means of an operating interface on the display and/or operating unit 51, the locking and unlocking of the transmitter unit 5 with the process connection 4 is triggered locally.

The on-site locking and unlocking can additionally be blocked or released via the communications network 16 connected to the transmitter unit 5, e.g., via a fieldbus interface. As a result, the protection against manipulation of the measuring system 1 is increased. Alternatively or additionally, the locking and unlocking of the transmitter unit 5 can also, via the communications network 16, be triggered by means of the control of the electric drive 14. If, for example, no local operating unit is available on the transmitter unit 5, the locking and unlocking can thus take place exclusively via the communications network 16.

In the case where the user has a mobile end device that can be connected to the communications network 16, for example, the locking and unlocking can be triggered at any point, i.e., locally as well. The mobile end device is, for example, a smartphone, a laptop or tablet, a smartwatch, data glasses, or even a mobile end device specifically for process automation, such as the "FieldXpert" sold by Endress+Hauser.

The variant of the present disclosure shown in FIG. 4 can, naturally, also be combined with the coupling unit 6 shown in FIG. 2b which extends over the process connection 4. In contrast to FIG. 2b, the coupling unit 6 has a one-piece outside wall. In this case, a very high protection against manipulation results, since none of the components of the measuring system 1 can be removed from the process connection 4 without the respective control of the electric drive 14, which requires the approval via the communications network 16, where applicable. The counter body 9 in FIG. 4 is designed as a retaining groove 10a, 10b introduced into the base plate 12. A latching element 8 of the coupling unit 6, which latching element can be moved by the electric drive 14, can engage in these grooves 10a, 10b.

This mechanism is shown in more detail in the sectional view of the coupling unit in FIG. 5a and in the perspective view of the latching element 8 in FIG. 5b. By means of a mechanism comparable to a lathe chuck, the coupling unit 6 is firmly clamped together with the grooves 10a, 10b contained in the base plate 12 via movable chuck jaws of the latching element 8.

In this case, the electric drive 14 actuates a gear ring of the flat thread shown in FIG. 5b by means of a worm gear. The motor current can in this case be used as an indicator of having reached the two end positions (i.e., transmitter unit 5 and process connection 4 are mechanically disconnected or connected). The flat thread and worm drive prevent any loosening of the counter pieces 11*a*, 11*b* of the latching element 8 clamped into the grooves 10*a*, 10*b*, which counter pieces could otherwise be disconnected by strong vibrations in the surroundings close to the process, for example. Both elements exclusively allow for a force transmission in the direction of rotation of the worm gear.

As shown in FIG. 5*b*, the grooves 10*a*, 10*b* can be designed as part of a gear ring, in order to completely exclude a movement of the transmitter unit 5 relative to the process connection 4, despite the locking.

In summary, the present disclosure shows two different variants of a mechanical connection between the transmitter unit 5 and the process connection 4 that can be disconnected/connected in a toolless manner. The first variant comprises a manually-operable variant (FIGS. 1 through 3), whereas the second variant comprises a variant that can be operated by means of an electric drive 14. (FIGS. 4 and 5). In this case, the measuring system 1 according to the present disclosure is, naturally, not limited to the features explained in connection with the figures.

The present disclosure also comprises, in particular, designs without base plate 12;
in the case of the manually-operable toolless variant: the already-mentioned design in which the first section 61 and the second section 62 of the coupling unit 6 can be moved towards each other in the axial direction Rax, whereby a relative movement between the latching element 8 and the counter body 9 is caused; as well as designs with any—in particular, electrochemical—sensor elements 2.

The advantages of the present disclosure are listed, in conclusion, once again here:
A connection, close to the process and sensor element, of a transmitter unit designed as head transmitter is provided.
The present disclosure is, in particular, advantageous for sensor elements 2 with an inductive "Memosens" interface.
The mechanical connection that can be disconnected in a toolless manner allows for a quick and toolless removal or exchange of the sensor elements 2. This results in a reduction in the maintenance times, e.g., when pH sensors are exchanged.
The mechanical connection is locked in a self-locking manner.
As a result of the modular structure, a uniform mechanism of the mechanical connection for different types of sensor elements is created.

The invention claimed is:

1. A modular measuring system, comprising:
a sensor element that is designed to determine and/or monitor a measured variable of a medium and is insertable into a process connection arranged in a pipe wall or container wall, wherein the sensor element inserted into the process connection protrudes through the pipe wall or container wall; and
a transmitter unit that serves to process and/or transmit electronic and/or electrical signals that represent the measured variable and are generated by the sensor element,
wherein the transmitter unit is mechanically connectable to the process connection by a coupling unit,
wherein the coupling unit is arranged on an end region, which faces the process connection, of the transmitter unit, and
wherein the coupling unit is mechanically connectable to the process connection and mechanically disconnectable from the process connection such that a latching element of the coupling unit arranged inside the coupling unit carries out a relative movement in relation to a counter body, wherein the counter body is mechanically connectable to the latching element and the counter body is arranged in the process connection,
wherein the counter body is a base plate that is arranged in the process connection and compatible with the coupling unit and the sensor element,
wherein the base plate has a recess into which the sensor element is insertable,
wherein when the sensor element is inserted into the recess, the sensor element protrudes through the base plate, and
wherein the relative movement is a rotation of the latching element of the coupling unit relative to the counter body of the process connection by an angle of rotation of less than 360°.

2. The modular measuring system according to claim 1, wherein the mechanically disconnectable connection between the coupling unit and the process connection is designed as a simple quick-coupling.

3. The modular measuring system according to claim 1, wherein the coupling unit is designed such that the relative movement between the latching element, arranged inside the coupling unit, and the counter body can be triggered in a toolless manner so that the coupling unit is mechanically connectable to the process connection in the toolless manner and is mechanically disconnectable from the process connection in the toolless manner.

4. The modular measuring system according to claim 3, wherein the counter body has a groove and the latching element respectively has a counter piece that corresponds to the groove, or the latching element has a groove and the counter body respectively has a counter piece that corresponds to the groove, and
wherein, when the process connection is connected mechanically to the coupling unit, the corresponding counter piece protrudes into the groove.

5. The modular measuring system according to claim 4, wherein the relative movement includes a turning of the at least one groove into the at least one counter piece.

6. The modular measuring system according to claim 1, wherein the coupling unit has a first section, which is arranged on an outside wall of the coupling unit and adjoins the process connection, and a second section, which is arranged on an outside wall of the coupling unit and adjoins the first section in a direction facing away from the process connection,
wherein the first section and the second section are rotatable against each other manually and/or moveable towards each other manually in an axial direction along the longitudinal axis of the coupling unit, and
wherein the mechanical connection between the latching element and the counter body is disconnected by the manual rotation of the first section relative to the second section and/or by the manual movement of the first section relative to the second section in the axial direction.

7. The modular measuring system according to claim 6, wherein, when the latching element is connected mechanically to the counter body, a predetermined counterforce, including a magnetic force and/or a spring force caused by a spring element, is provided that counteracts a force required for manually disconnecting the manual connection between the coupling unit and the process connection,
   wherein the force required for manually disconnecting the manual connection includes a force required for manually rotating the first section relative to the second section and/or a force required for manually moving the first section relative to the second section.

8. The modular measuring system according to claim 1, wherein the coupling unit has an electric drive that is arranged inside the coupling unit and designed to move the latching element relative to the counter body that is connected mechanically connectable to the latching element and is arranged in the process connection so that the mechanically disconnectable connection between the coupling unit and the process connection is disconnectable or lockable by a control of the electric drive.

9. The modular measuring system according to claim 1, wherein the coupling unit is designed such that the coupling unit seals the coupling unit transmitter unit in a liquid-tight manner in the end region, which faces the process connection, of the transmitter unit in case the coupling unit is mechanically disconnected from the process connection and moved away from the process connection.

10. The modular measuring system according to claim 1,
   wherein a plug connection arranged inside the transmitter unit is provided,
   wherein the plug connection connects an end region of the sensor element to the transmitter unit when the sensor element is inserted into the process connection and the coupling unit is mechanically connected to the process connection, and
   wherein the plug connection is designed for a magnetic inductive transmission of electronic and/or electrical signals generated by the sensor element to the transmitter unit.

11. The modular measuring system according to claim 1, wherein the transmitter unit is connectable to a wired and/or wireless communications network that serves to supply energy to the measuring system and/or to transmit electronic and/or electrical signals between a higher-level unit, connected to the communications network, and the transmitter unit.

12. The modular measuring system according to claim 8, wherein the transmitter unit is connectable to a wired and/or wireless communications network, and
   wherein the electric drive is controllable by the communications network and/or by a display and/or operating unit arranged on the transmitter unit.

13. The modular measuring system according to claim 5, wherein the base plate and the coupling unit are designed such that the base plate is removable from the process connection only when the coupling unit of the transmitter unit is disconnected from the base plate and moved away from the base plate in a direction substantially orthogonal to the base plate.

14. The modular measuring system according to claim 1, wherein the sensor element is an electrochemical sensor element.

15. The modular measuring system according to claim 1,
   wherein the sensor element is elongated, and the coupling unit has a guide that is arranged inside the coupling unit and that is elongated in the axial direction of the coupling unit, and
   wherein, when the coupling unit is mechanically connected to the process connection, the sensor element is accommodated in the guide.

\* \* \* \* \*